United States Patent
Kim et al.

(10) Patent No.: US 12,259,367 B2
(45) Date of Patent: Mar. 25, 2025

(54) FATIGUE TESTING APPARATUS FOR METALLIC FOIL AND METHOD USING SAME

(71) Applicant: LG ENERGY SOLUTION, LTD., Seoul (KR)

(72) Inventors: Ki Tae Kim, Daejeon (KR); Hyung Kyun Yu, Daejeon (KR); Ki Hoon Paeng, Daejeon (KR); Sang Myeon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 402 days.

(21) Appl. No.: 17/775,625

(22) PCT Filed: Jan. 20, 2021

(86) PCT No.: PCT/KR2021/095024
§ 371 (c)(1),
(2) Date: May 10, 2022

(87) PCT Pub. No.: WO2021/261980
PCT Pub. Date: Dec. 30, 2021

(65) Prior Publication Data
US 2022/0397502 A1   Dec. 15, 2022

(30) Foreign Application Priority Data
Jun. 23, 2020  (KR) .................. 10-2020-0076337

(51) Int. Cl.
*G01N 3/34*  (2006.01)
(52) U.S. Cl.
CPC ....... *G01N 3/34* (2013.01); *G01N 2203/0017* (2013.01); *G01N 2203/0037* (2013.01);
(Continued)

(58) Field of Classification Search
CPC ............. G01N 3/34; G01N 2203/0017; G01N 2203/0037; G01N 2203/0073;
(Continued)

(56) References Cited

U.S. PATENT DOCUMENTS

| 6,439,059 B1 | 8/2002 | Inoue et al. |
| 7,647,845 B2 * | 1/2010 | Hiesinger ............ B65H 23/044 73/862.391 |

(Continued)

FOREIGN PATENT DOCUMENTS

| CN | 207964482 U | 10/2018 |
| JP | H01-219609 A | 9/1989 |

(Continued)

OTHER PUBLICATIONS

Extended European Search Report dated Oct. 7, 2022 issued in corresponding European Patent Application No. 21827890.1.
(Continued)

*Primary Examiner* — Freddie Kirkland, III
(74) *Attorney, Agent, or Firm* — MORGAN, LEWIS & BOCKIUS LLP (57) ABSTRACT

The present invention relates to a metal foil fatigue test apparatus and a metal foil fatigue test method using the same. The metal foil fatigue test apparatus includes: a metal foil moving unit including an unwinding roll, from which a metal foil is unwound, a plurality of guide rolls configured to support and transfer the metal foil supplied from the unwinding roll, and a rewinding roll where the metal foil transferred from the guide rolls is wound; and a tensile strength measuring unit configured to measure tensile strength of the metal foil.

17 Claims, 6 Drawing Sheets

(52) U.S. Cl.
CPC ............... *G01N 2203/0073* (2013.01); *G01N 2203/0202* (2013.01)

(58) Field of Classification Search
CPC ... G01N 2203/0202; G01N 2203/0282; G01N 3/08; G01N 3/32; G01N 3/16; G01N 3/24; H01M 4/139; H01M 4/661; H01M 10/4285; H01M 10/0431; Y02E 60/10
See application file for complete search history.

(56) References Cited

U.S. PATENT DOCUMENTS

| | | |
|---|---|---|
| 10,050,256 B2 * | 8/2018 | Umeyama ............ H01M 4/139 |
| 2001/0008091 A1 | 7/2001 | Takahashi et al. |
| 2005/0166670 A1 | 8/2005 | Franz et al. |
| 2019/0210388 A1 | 7/2019 | Chaturvedi |
| 2019/0217522 A1 | 7/2019 | Nieto et al. |
| 2022/0390341 A1 * | 12/2022 | Kim ........................ G01N 3/10 |

FOREIGN PATENT DOCUMENTS

| | | |
|---|---|---|
| JP | H05-107165 A | 4/1993 |
| JP | 2000-283885 A | 10/2000 |
| JP | 2007-519935 A | 7/2007 |
| JP | 2011-048912 A | 3/2011 |
| JP | 2018-176494 A | 11/2018 |
| KR | 20-1998-0017598 U | 7/1998 |
| KR | 10-2003-0024134 A | 3/2003 |
| KR | 10-2010-0110671 A | 10/2010 |
| KR | 10-2005-0032726 A | 11/2010 |
| KR | 10-2011-0092207 A | 8/2011 |
| KR | 10-1123617 B1 | 3/2012 |
| KR | 10-2014-0032659 A | 3/2014 |
| KR | 10-1376160 B1 | 3/2014 |
| KR | 10-2014-0069826 A | 6/2014 |
| KR | 10-1447045 B1 | 10/2014 |
| KR | 10-1494797 B1 | 2/2015 |
| KR | 10-1501119 B1 | 3/2015 |
| KR | 10-1519846 B1 | 5/2015 |
| KR | 10-2015-0141412 A | 12/2015 |
| KR | 10-1686292 B1 | 12/2016 |
| KR | 10-2023581 B1 | 9/2019 |

OTHER PUBLICATIONS

International Search Report (with partial translation) and Written Opinion dated Apr. 20, 2021 issued in corresponding International Patent Application No. PCT/KR2021/095024.
Office Action dated Jul. 21, 2024 issued in Korean Patent Application No. 10-2020-0076337.

* cited by examiner

[FIG. 1]

— PRIOR ART —

FATIGUE TESTING APPARATUS FOR METALLIC FOIL AND METHOD USING SAME

TECHNICAL FIELD

This application claims the benefit of priority based on Korean Patent Application No. 10-2020-0076337, filed on Jun. 23, 2020, and the entire contents of the Korean patent application are incorporated herein by reference.

The present invention relates to a metal foil fatigue test apparatus and a metal foil fatigue test method using the same.

BACKGROUND ART

As technologies for mobile devices are developed and demand for the mobile devices increases, there has been a rapid increase in demand for secondary batteries as energy sources. Among such secondary batteries, lithium secondary batteries, which exhibit a high energy density and operational potential, a long cycle life, and a low self-discharge rate have been commercialized and widely used.

In recent years, there has been a growing interest in environmental issues, and as a result, recently, electric vehicles (EVs) and hybrid electric vehicles (HEVs), which can replace fossil-fueled vehicles such as gasoline vehicles and diesel vehicles, and the like are widely studied. Although a nickel metal hydride (Ni-MH) secondary battery is mainly used as a power source for such an electric vehicle (EV) and a hybrid electric vehicle (HEV), researches about using a lithium secondary battery having a high energy density, a high discharge voltage and an output stability have been actively conducted, and some of them have been commercialized.

The lithium secondary battery has a structure in which an electrode assembly of positive electrode/separator/negative electrode is embedded in a sealed container with an electrolyte. In order to manufacture a positive electrode or a negative electrode, an electrode mixture including an electrode active material is coated on an electrode current collector made of a long metal foil in one direction.

At this time a roll-to-roll process is used in most of processes for manufacturing an electrode, such as a roll press process, a slitting process, a notching process, a lamination process, and a folding process. The roll-to-roll process means a system in which various processes are consecutively performed as a web made of a material, which has a large width and transfer length compared to its thickness, passes rollers. In the roll-to-roll process, several bendable metal foils, etc. may be moved between rollers, during which coating, printing, etc. may be performed. The roll-to-roll process has advantages in efficiency, storage space, and convenience in a high speed job, etc.

Figure 1:
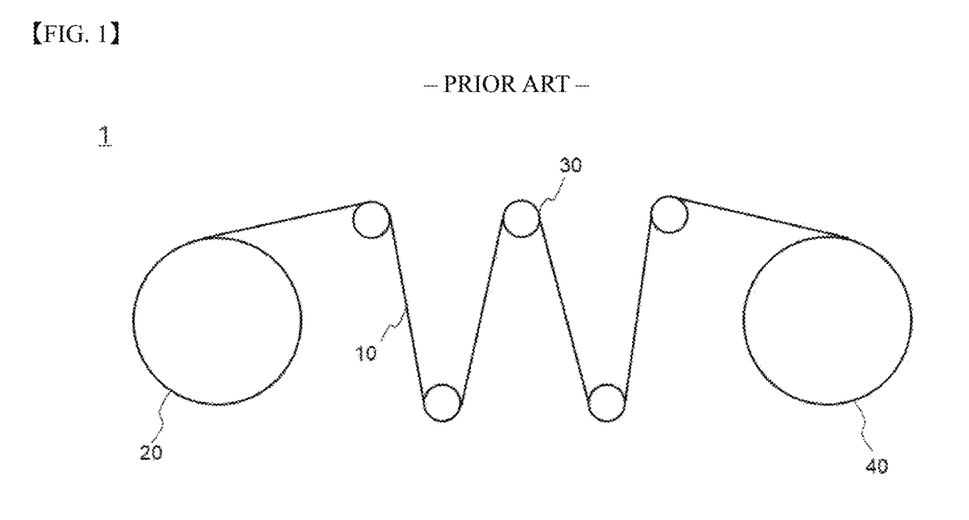
FIG. 1 is a schematical diagram illustrating the form of a metal foil moving device used in a roll-to-roll process.

FIG. 1 is a schematical diagram illustrating the form of a metal foil moving device used in a roll-to-roll process.

Referring to FIG. 1, the metal foil moving device includes a unwinding roll, a guide roll, and a winding roll. One end of the metal foil is transferred toward the guide roll in a state that the metal foil has been wound on the unwinding roll. The metal foil is transferred by rotation of each roll in a state that is supported by the guide roll, and is finally wound on the winding roll after going through a process which is necessary during the transfer process.

Likewise, when a substrate such as a metal foil is repeatedly transferred on the roll, the degree of fatigue of the metal foil increases by the tension applied between rolls and the stress applied when wound by the roll. If such a phenomenon occurs, cracks or disconnection phenomena may occur in the metal foil, which causes the defect of the product.

Therefore, it is necessary to properly set the movement condition of the metal foil during the roll-to-roll process, and it is necessary to develop an accurate evaluation method for setting such a movement condition.

DISCLOSURE

Technical Problem

An object of the present invention is to provide a metal foil fatigue test apparatus capable of measuring a degree of fatigue of a metal foil according to movement of the metal foil and predicting the lifespan of the metal foil and a metal foil fatigue test method using the apparatus, in a metal foil which may be used as a substrate in a roll-to-roll process.

Technical Solution

An apparatus for testing a fatigue of a metal foil according to the present invention includes: a metal foil moving unit including an unwinding roll, from which a metal foil is unwound, a plurality of guide rolls configured to support and transfer the metal foil supplied from the unwinding roll, and a rewinding roll where the metal foil transferred from the guide rolls is wound; and a tensile strength measuring unit configured to measure tensile strength of the metal foil.

In an embodiment of the present invention, the metal foil fatigue test apparatus further includes: a controller unit configured to set and change movement conditions of the metal foil; and a storage unit configured to store a measurement result of the tensile strength.

In one embodiment of the present invention, the metal foil fatigue test apparatus further includes a disconnection detection unit configured to detect whether the metal foil has been disconnected.

In one embodiment of the present invention, the disconnection detection unit may be located on a moving path of the metal foil.

Further, the present invention provides a metal foil fatigue test method using a metal foil fatigue test apparatus. The metal foil fatigue test method includes: a step of mounting a metal foil on the metal foil moving unit of the above-described metal foil fatigue test apparatus; a step of repeatedly moving the metal foil between an unwinding roll and a rewinding roll in a forward direction and a reverse direction; and a step of measuring tensile strength of the repeatedly moved metal foil.

In one embodiment of the present invention, the metal foil may be made of aluminum or cooper.

In one embodiment of the present invention, the metal foil fatigue test method may further include a step of setting movement conditions of the metal foil.

Herein, the movement conditions of the metal foil may include one or more of a winding direction of the metal foil, a number of times of winding of the metal foil, tensile force applied to the metal foil, and a moving speed of the metal foil.

In one embodiment of the present invention, the step of setting the movement condition of the metal foil may be performed before the step of repeatedly moving the metal foil.

In another embodiment of the present invention, the step of setting the movement condition of the metal foil may be performed during the step of repeatedly moving the metal foil.

In another embodiment of the present invention, the metal foil fatigue test method may further include a step of measuring tensile strength of the metal foil before movement and calculating a change in the tensile strength according to movement conditions of the metal foil before and after movement.

In another embodiment of the present invention, the metal foil fatigue test method may further include a step of storing movement conditions of the metal foil and tensile strengths of the metal foil according to the movement conditions.

In another embodiment of the present invention, the metal foil fatigue test method may further include a step of detecting whether a disconnection has occurred in the metal foil.

Herein, the step of detecting whether the disconnection has occurred may be performed during or after the moving step.

Advantageous Effects

According to a metal foil fatigue test apparatus and a metal foil fatigue test method of the present invention, the degree of fatigue and lifespan of the metal may be predicted by appropriately setting the movement conditions of the metal foil in a roll-to-roll process and simulating movement of the metal foil according thereto.

Further, by storing the degree of fatigue of the metal foil according to the movement conditions of the metal foil in a database, the conditions may be appropriately set in the actual roll-to-roll process, and the defect of the metal foil in the roll-to-roll process may be reduced.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

Figure 2:
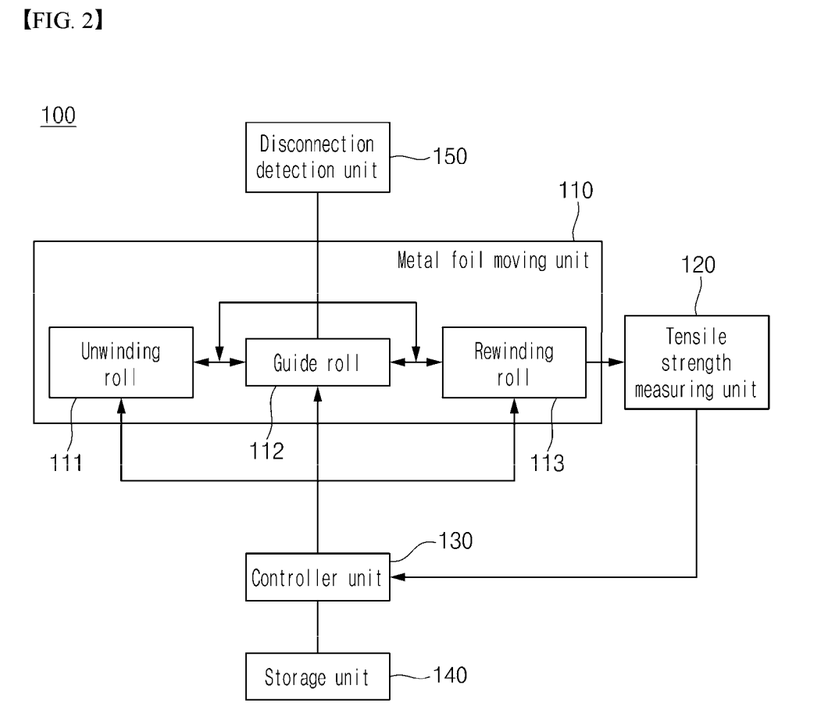
FIG. 2 is a block diagram illustrating each component of a metal foil fatigue test apparatus according to the present invention.

FIG. 2 is a block diagram illustrating each component of a metal foil fatigue test apparatus according to the present invention.

Referring to FIG. 2, the metal foil fatigue test apparatus 100 according to the present invention includes a metal foil moving unit 110 and a tensile strength measuring unit 120.

As described above, in the roll-to-roll process, when a substrate such as a metal foil is repeatedly transferred on the roll, the degree of fatigue of the metal foil increases by the stress received between rolls and the stress received when the metal foil is wound and unwound. If such a phenomenon occurs, cracks or disconnection phenomena may occur in the metal foil, which causes the defect of the product.

As such, in order to predict the degree of fatigue and lifespan of a metal foil, the inventors of the present invention have devised a metal foil fatigue test apparatus for easily recognizing the degree of fatigue and lifespan of the metal foil according to repeated movements of the foil by applying certain stress while repeatedly moving the metal foil on a metal foil moving unit, which simulates a roll-to-roll device, and then measuring the tensile strength of the metal foil.

Figure 3:
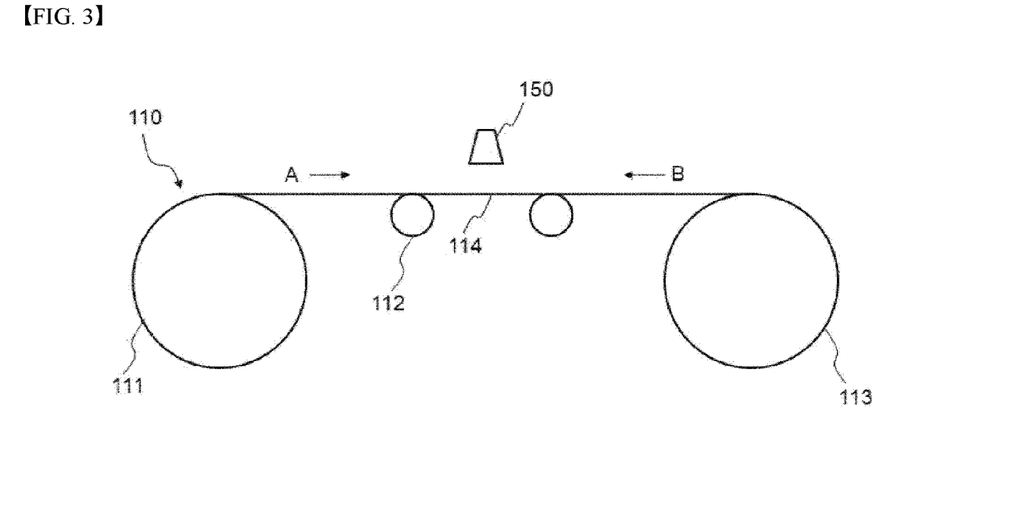
FIG. 3 is a schematic diagram showing a configuration of a metal foil moving unit in a metal foil fatigue test apparatus according to the present invention.

FIG. 3 is a schematic diagram showing a configuration of a metal foil moving unit 110 in a metal foil fatigue test apparatus according to the present invention.

Referring to FIG. 3, in the metal foil fatigue test apparatus, the metal foil moving unit 110 is implemented to accurately simulate the movement of the roll moving in the actual roll-to-roll process. Specifically, the metal foil moving unit 110 includes an unwinding roll 111 on which a metal foil 114 is unwound, a plurality of guide rolls 112 for supporting and transferring the metal foil 114 supplied from the unwinding roll 111, and a rewinding roll 113 on which the metal foil, transferred from the guide rolls 112, is wound. This simulates the configuration of the apparatus in the actual roll-to-roll process. The metal foil 114 is repeatedly transferred in a forward direction and a reverse direction and is repeatedly wound and unwound on the unwinding roll 111 and the rewinding roll 113. The forward direction means a direction (A direction) moving from the unwinding roll 111 to the rewinding roll 113, and the reverse direction means a direction (B direction) moving from the rewinding roll 113 to the unwinding roll 111. At least one guide roll 112 is located between the unwinding roll 111 and the rewinding roll 113, to thereby prevent the metal foil from being bent in a gravity direction and transfer the metal foil.

According to the metal foil fatigue test apparatus of the present invention, by appropriately setting the movement conditions of the metal foil which is moved on the metal foil moving unit, it is possible to recognize the conditions in which the degree of fatigue of the metal foil easily increases, or it is possible to recognize conditions in which the metal foil is broken during the movement of the metal foil, from which it is possible to predict the degree of fatigue and lifespan of the metal foil according to the movement.

The tensile strength measuring unit 120 measures the tensile strength of the metal foil which is repeatedly moved in the metal foil moving unit 110. The tensile strength measuring unit 120 may be separately provided from the metal foil moving unit 110. In this case, the metal foil, of which the movement has stopped in the metal foil moving unit 110, may be extracted to thereby be transferred to the tensile strength measuring unit 120 and, and the tensile strength may be measured.

To this end, the metal foil fatigue test apparatus 100 may further include a controller unit 130 for setting and changing the movement condition of the metal foil. The controller unit 130 may input conditions of the movement fatigue test and receive the input of the test result.

Specifically, the controller unit 130 may include an input tool (not shown) for inputting information of the metal foil, which becomes the subject of the fatigue test, and the controller unit may receive the input of information of the metal foil which becomes the subject of the fatigue test through this. For example, information such as the type of the metal foil, tensile strength and hardness may be included in the information on the metal foil. In particular, the tensile strength of the metal foil is tensile strength of the metal foil moving device before repeated movements of the metal foil. This may be compared with the tensile strength of the metal foil after repeated movements of the metal foil, which may then be used as the criteria for determining the increase of the degree of fatigue of the metal foil after movement of the metal foil.

Further, the controller unit 130 may set the movement condition of the metal foil and input the movement condition to the metal foil moving unit. Herein, the movement conditions of the metal foil may include one or more of a winding direction of the metal foil, a number of times of winding of the metal foil, tensile force applied to the metal foil, and a moving speed of the metal foil. Further, the controller unit may adjust the direction in which stress is applied to the metal foil, by adjusting the location of each roll constituting the metal foil moving unit 110. The controller unit 130 may control the metal foil moving unit 110 to operate according to preset movement conditions.

Further, the controller unit 130 may include a receiving tool (not shown) configured to receive the input of the result of the movement fatigue test. When the fatigue test is completed, the controller unit 130 may receive the input of the result of the fatigue test and transmit the information to the storage unit.

The storage unit 140 receives a test result, specifically a result of measuring tensile strength, from the controller unit 130 and stores the result. The storage unit 140 may store the result of measuring the tensile strength and make a database using with the result information. Specifically, the types of the metal foil may be classified according to the material, thickness and hardness of the metal foil, and the result of measuring tensile strength for each movement condition can be displayed through a table or a graph. Such measurement data may be used as grounds for predicting the degree of fatigue and lifespan of the metal foil when various movement conditions are combined.

Herein, the user may directly operate the controller unit 130 and the storage unit 140, but the controller unit 130 and the storage unit 140 may also be operated by an automated system. For example, when a movement condition is input to the controller unit 130, the metal foil moving unit 110 operates at predetermined movement conditions, and when completed, the metal foil is transferred to the tensile strength measuring unit 120 to thereby measure the tensile strength. The result may be received by the controller unit 130 again and stored in the storage unit 140. When this process is completed, the controller unit 130 may automatically change the movement condition to repeat the same process.

Meanwhile, when the metal foil is repeatedly moved on the metal foil moving unit 110, if the stress applied to the metal foil is severe, it may cause disconnection to the metal foil. Such a disconnection phenomenon may be checked through a crack generated on the metal foil, etc. The present invention may provide a disconnection detection unit 150 for detecting whether the metal foil has been disconnected, to thereby recognize under what conditions the disconnection of the metal foil has occurred.

Referring to FIG. 3, the disconnection detection unit 150 may be located on the moving path of the metal foil 114. In other words, the disconnection detection unit 150 may be located at the upper or lower portion of the metal foil 114 which is repeatedly moved on the moving path, and the disconnection of the metal foil 1140 can be detected in real time. Further, at least one disconnection detection unit 150 may be located on the moving path of the metal foil. Referring to FIG. 3, the disconnection detection unit 150 is located on the moving path between the guide rolls 112, but the disconnection detection unit 150 may also be located on the moving path between the unwinding roll 111 and the guide roll 112 or between the guide roll 112 and the rewinding roll 113.

Meanwhile, in the disconnection detection unit 150, the disconnection detection may be performed using a known method. For example, the disconnection detection may be performed using a camera, ultrasonic waves, or an eddy current detection scheme.

In the case of an imaging camera, the cracks occurring in the metal foil moving between the rolls can be directly taken and detected. In the case of the ultrasonic wave detection method, the ultrasonic waves are oscillated to the metal foil, and waves returned by the echo phenomenon are sensed, to thereby detect whether disconnection has occurred through signal processing. The eddy current detection scheme is a scheme of detecting disconnection through the eddy current generated in the metal foil when allowing the coil, where the alternating current flows, to approach the metal foil. This detection method is known to those skilled in the art, and a detailed description thereof will be omitted here.

Further, the present invention provides a method for testing fatigue of a metal foil using the above-mentioned metal foil fatigue test apparatus.

Figure 4:
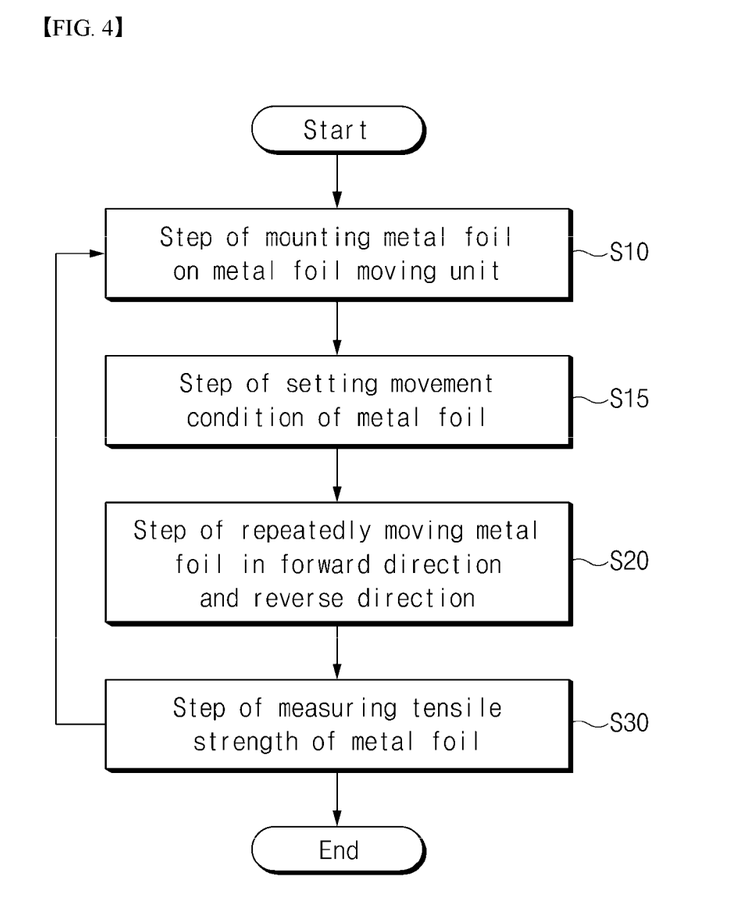
FIG. 4 is a flowchart illustrating a metal foil fatigue test method according to one embodiment of the present invention.

FIG. 4 is a flowchart illustrating a metal foil fatigue test method according to one embodiment of the present invention.

Referring to FIG. 4, a metal foil fatigue test method according to an embodiment of the present invention includes: a step of mounting a metal foil on the metal foil moving unit of the metal foil fatigue test apparatus (S10); a step of repeatedly moving the metal foil between an unwinding roll and a rewinding roll in a forward direction and a reverse direction (S20); and a step of measuring tensile strength of the repeatedly moved metal foil (S30).

In the step (S10) of mounting the metal foil, the metal foil is disposed on the moving path, and two sides of the metal foil are wound on the unwinding roll and the rewinding roll, respectively. At this time, the number of times of winding can be appropriately set according to the movement conditions of the metal foil.

In the step (S20) of repeatedly moving the metal foil, the metal foil is repeatedly moved on the predetermined movement conditions in a forward direction and a reverse direction. As described above, the forward direction means a direction (A direction) moving from the unwinding roll to the rewinding roll, and the reverse direction means a direction (B direction) moving from the rewinding roll to the unwinding roll.

In the tensile strength measuring step (S30), the tensile strength is measured for a predetermined point of the repeatedly moved measuring step. The tensile strength of the metal foil may be measured according a normal known method. For example, tensile force is applied to both sides of a portion to be measured in the metal foil, and the force applied to the metal foil when a breakage occurs may be measured. At this time, the value obtained by dividing the maximum tensile load measured at this time by the cross-sectional area of the metal foil may be defined as tensile strength. As such, the method of measuring the tensile strength is known to one of ordinary skill in the art, and thus a detailed description thereof will be omitted here.

When the tensile strength measuring step (S30) is completed, a new metal foil may be mounted on a metal foil mounting portion by returning to the step (S10) of mounting the metal foil, to thereby perform a test in a new movement condition.

In one embodiment of the present invention, there is no particular limitation on the material of the metal foil, but aluminum or cooper, which is mainly used as the electrode current collector in the lithium secondary battery, may be used.

Further, the metal foil fatigue test method according to the present invention includes a step (S15) of setting the movement condition of a metal foil. According to the metal foil fatigue test method of the present invention, it is possible to easily recognize the degree of fatigue and lifespan of the metal foil according to the repeated movements of the foil by simulating the movement of the metal foil under various environments and conditions to which the metal foil in the actual roll-to-roll process may be exposed.

For example, the movement conditions of the metal foil may include one or more of a winding direction of the metal foil, a number of times of winding of the metal foil, tensile force applied to the metal foil, and a moving speed of the metal foil.

Herein, the winding direction of the metal foil means a direction in which the metal foil is moved, and the metal foil may be wound in a forward direction or a reverse direction. The number of times of winding means the number of times of the movement of the metal foil in a forward direction and a reverse direction. At this time, the metal foil may be set to be completely wound on the unwinding roll or the rewinding roll by one-time movement. Further, for example, it is possible to move the metal foil again in an opposite direction in a state that the metal foil has been partly wound on the unwinding roll or the rewinding roll.

Next, the tensile force applied to the metal foil means tensile force applied to the metal foil in a part between a unwinding roll and a guide roll, between guide rolls, or between a guide roll and a rewinding roll. Namely, when the tensile force applied to the metal foil is large, it means that the metal foil has been pulled tightly. For example, the tensile force applied to the metal foil may be set by adjusting the torque of the roll.

The moving speed of the metal foil is a speed at which the metal foil moves between rolls. The moving speed of the metal foil can be changed, for example, by adjusting the angular velocity of the roll.

In addition, the movement condition of the metal foil may be set while appropriately adjusting the number and locations of the guide rolls or the atmospheric environment where the metal foil is exposed.

The step (S15) of setting the movement condition of the metal foil may be performed before the step (S20) of repeatedly moving the metal foil. In this case, it is possible to set one movement condition per one metal foil, and when measurement is completed under one movement condition, a new metal foil is mounted, and a movement condition, which is different from before, may be set.

Further, the step (S15) of setting the movement condition of the metal foil may be performed during the step (S20) of repeatedly moving the metal foil. In this case, the movement condition, which has been set, is changed during the movement of the metal foil. This allows prediction on the influence about the change which may occur during the movement of the metal foil.

In a more specific example, the metal foil fatigue test method may further include a step of measuring tensile strength of the metal foil before movement and calculating a change in the tensile strength according to movement conditions of the metal foil before and after movement.

Further, the metal foil fatigue test method may further include a step of storing movement conditions of the metal foil and tensile strengths of the metal foil according to the movement conditions.

Figure 5:
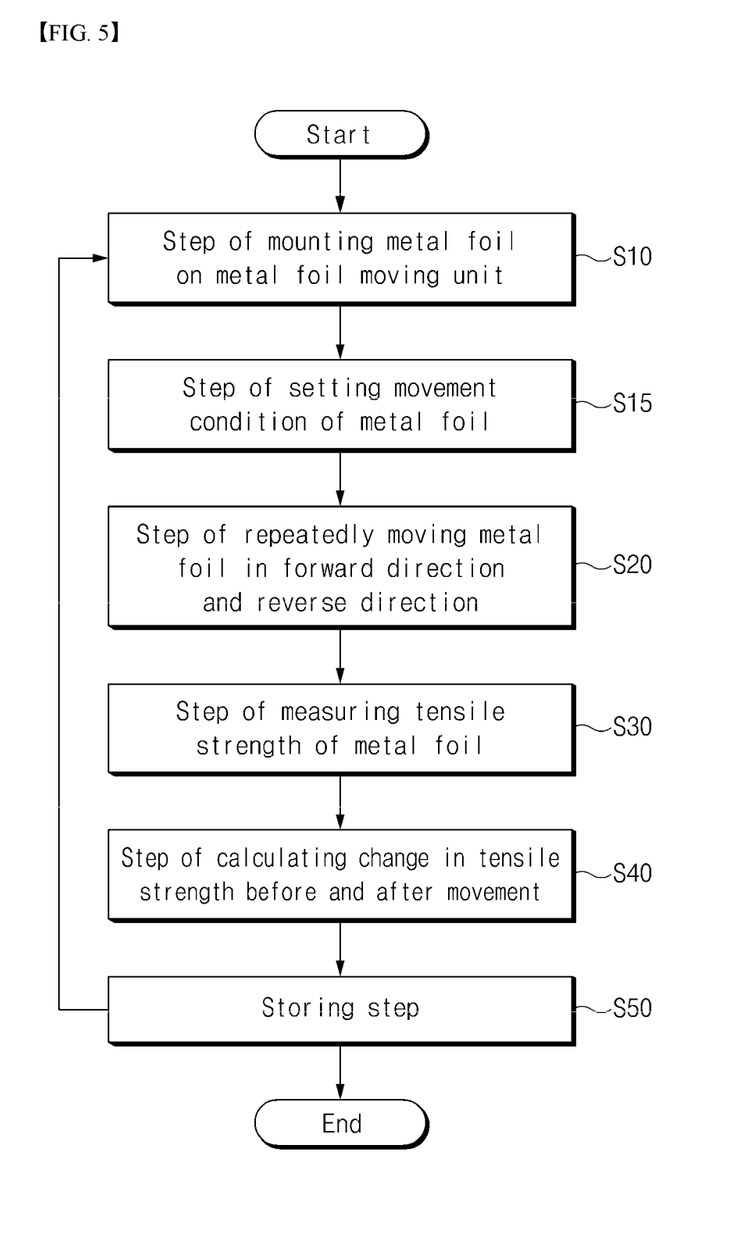
FIG. 5 is a flowchart illustrating a metal foil fatigue test method according to another embodiment of the present invention.

FIG. 5 is a flowchart illustrating a metal foil fatigue test method according to another embodiment of the present invention.

Referring to FIG. 5, the metal foil fatigue test method may include: a step of mounting a metal foil on the metal foil moving unit of the metal foil fatigue test apparatus (S10); a step of setting movement conditions of the metal foil (S15); a step of repeatedly moving the metal foil between an unwinding roll and a rewinding roll in a forward direction and a reverse direction (S20); a step of measuring tensile strength of the repeatedly moved metal foil (S30); a step of calculating a change in the tensile strength according to movement conditions of the metal foil before and after movement (S40); and a step of storing movement conditions of the metal foil and tensile strengths of the metal foil according to the movement conditions (S50).

In this case, when the storing step (S50) is terminated, a test may be performed for a new metal foil in a new movement condition by going back to the first step.

Meanwhile, the step of measuring the tensile strength of the metal foil before movement may be performed before mounting the metal foil on the moving unit. Herein, the measured tensile strength data may be stored in the storage unit in advance.

According to the metal foil fatigue test method of the present invention, it is possible to measure the degree of fatigue of the metal and predict the lifespan of the metal foil by measuring the change in the tensile strength of the metal foil before and after the movement.

Further, this may be used as the grounds for predicting the degree of fatigue and lifespan of the metal foil when various movement conditions are combined by forming a database with information on the stored movement conditions of the metal foil and the tensile strengths according thereto.

Further, the metal foil fatigue test method may further include a step of detecting whether the metal foil has been disconnected.

Figure 6:
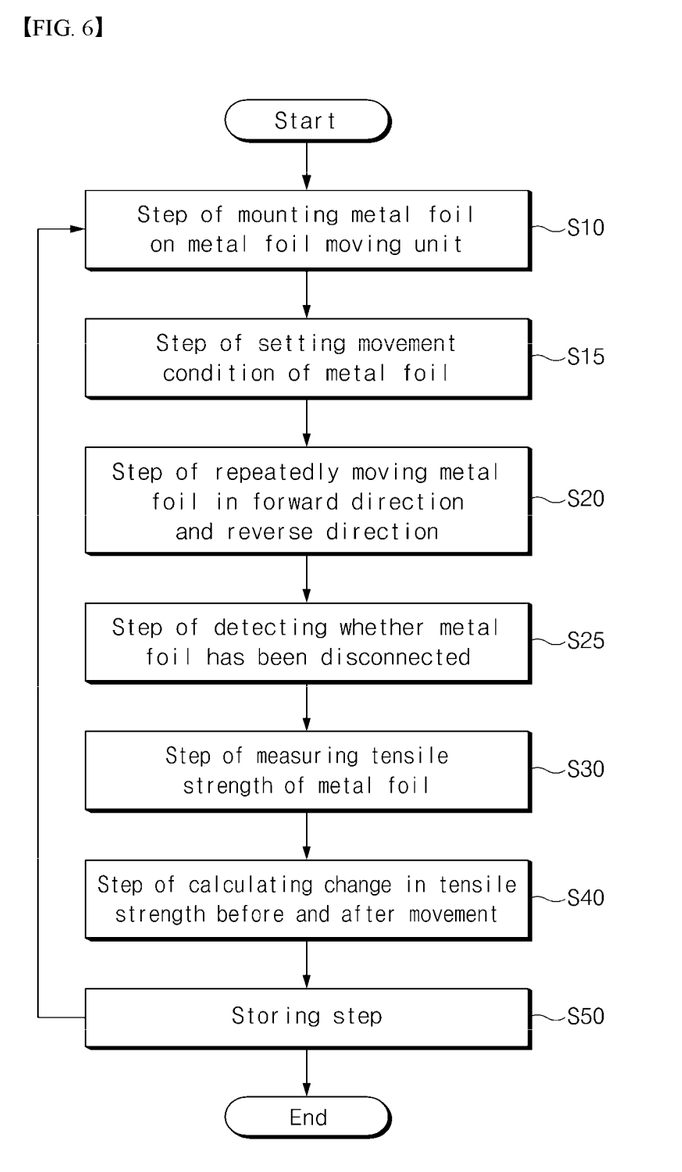
FIG. 6 is a flowchart illustrating a metal foil fatigue test method according to further another embodiment of the present invention.

FIG. 6 is a flowchart illustrating a metal foil fatigue test method according to further another embodiment of the present invention.

Referring to FIG. 6, the metal foil fatigue test method may include: a step of mounting a metal foil on the metal foil moving unit of the metal foil fatigue test apparatus (S10); a step of setting movement conditions of the metal foil (S15); a step of repeatedly moving the metal foil between an unwinding roll and a rewinding roll in a forward direction and a reverse direction (S20); a step of detecting whether a disconnection has occurred in the metal foil (S25); a step of measuring tensile strength of the repeatedly moved metal foil (S30); a step of calculating a change in the tensile strength according to movement conditions of the metal foil before and after movement (S40); and a step of storing movement conditions of the metal foil and tensile strengths of the metal foil according to the movement conditions (S50).

According to the metal foil fatigue test method of the present invention, it is possible to recognize in what conditions the metal foil is disconnected by detecting whether a disconnection phenomenon such as a crack occurs in the metal foil separately from the measurement of the tensile strength. The disconnection detection may be performed using a camera, ultrasonic waves, or an eddy current detection scheme, as described above.

The step (S25) of detecting whether the disconnection has occurred may be performed during the moving step. Namely, it is possible to recognize at which point of time disconnection occurs in a specific movement condition by real time performance during the movement of the metal foil.

Further, the step (S25) of detecting whether the disconnection has occurred may be performed after the moving step. In this case, whether the disconnection has occurred is preferably performed before measuring the tensile strength.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

The invention claimed is:

1. An apparatus for testing a fatigue of a metal foil, comprising:
a metal foil moving unit including an unwinding roll, from which a metal foil is unwound, a plurality of guide rolls configured to support and transfer the metal foil supplied from the unwinding roll, and a rewinding roll where the metal foil transferred from the guide rolls is wound;
a tensile strength measuring unit configured to measure tensile strength of the metal foil before and after movement of the metal foil repeatedly moved by the metal foil moving unit; and
a disconnection detection unit to detect whether the metal foil is disconnected by checking a crack generated on the metal foil.

2. The apparatus of claim 1, comprising:
a controller unit configured to set and change movement conditions of the metal foil; and
a storage unit configured to store a measurement result of the tensile strength.

3. The apparatus of claim 1, wherein the disconnection detection unit is located on a moving path of the metal foil.

4. A method of testing a fatigue of a metal foil using the apparatus according to claim 1, comprising:
mounting the metal foil on the metal foil moving unit of the apparatus;
repeatedly moving the metal foil between the unwinding roll and the rewinding roll in a forward direction and a reverse direction; and
measuring tensile strength of the repeatedly moved metal foil with the tensile strength measuring unit.

5. The method of claim 4, wherein the metal foil comprises aluminum or cooper.

6. The method of claim 4, further comprising setting movement conditions of the metal foil.

7. The method of claim 6, wherein the movement conditions of the metal foil include one or more of a winding direction of the metal foil, a number of times of winding of the metal foil, tensile force applied to the metal foil, and a moving speed of the metal foil.

8. The method of claim 6, wherein the setting the movement conditions of the metal foil is performed before the repeatedly moving the metal foil.

9. The method of claim 6, wherein the setting the movement conditions of the metal foil is performed during the repeatedly moving the metal foil.

10. The method of claim 6, further comprising measuring tensile strength of the metal foil before movement and calculating a change in the tensile strength according to the movement conditions of the metal foil before and after movement.

11. The method of claim 10, further comprising storing movement conditions of the metal foil and tensile strengths of the metal foil according to the movement conditions.

12. The method of claim 4, further comprising detecting whether a disconnection has occurred in the metal foil.

13. The method of claim 12, wherein the detecting whether the disconnection has occurred is performed during or after the repeatedly moving.

14. The apparatus of claim 1, wherein the disconnection detection unit is located at an upper or lower portion of the metal foil.

15. The apparatus of claim 1, wherein the disconnection detection includes a camera, wherein the crack is detected by the camera.

16. The apparatus of claim 1, wherein the disconnection detection includes an ultrasonic wave detection, wherein ultrasonic waves are oscillated to the metal foil, an the ultrasonic waves returned by echo phenomenon are sensed, thereby detect whether disconnection is occurred through signal processing.

17. The apparatus of claim 1, wherein the disconnection detection detects disconnection through eddy current generated in the metal foil.

* * * * *